Figure 1:
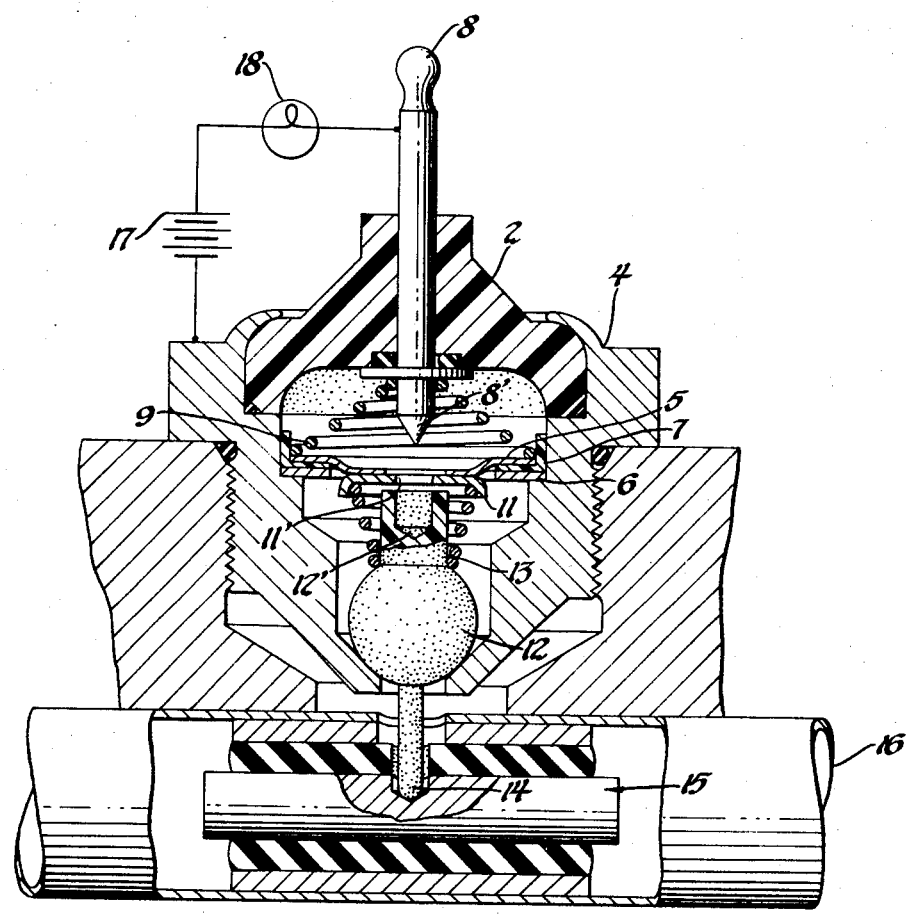

United States Patent [19]

Rike

[11] 3,739,119

[45] June 12, 1973

[54] PISTON ACTUATED PRESSURE RESPONSIVE SWITCH WITH RECENTER CONTACT ADJUSTMENT MEANS

[75] Inventor: Richard C. Rike, Dayton, Ohio

[73] Assignee: General Electric Corporation, Detroit, Mich.

[22] Filed: Sept. 1, 1971

[21] Appl. No.: 176,972

[52] U.S. Cl. ......... 200/82 D, 200/81.9 R, 200/82 R
[51] Int. Cl. ............................................. H01h 35/38
[58] Field of Search .............. 200/81.9 R, 82, 16 C, 200/82 R, 82 D, 83 R

[56] References Cited
UNITED STATES PATENTS

| | | | |
|---|---|---|---|
| 3,662,370 | 5/1972 | Barnes et al. .................. | 200/82 D X |
| 3,610,853 | 10/1971 | Reznicek ......................... | 200/82 D |
| 1,806,777 | 5/1931 | Wiley ............................... | 200/16 C |
| 941,053 | 11/1909 | Young ............................. | 200/81.9 R |
| 1,812,410 | 6/1931 | Mever .............................. | 200/16 C |
| 2,121,433 | 6/1938 | Kettunen ........................ | 200/82 R X |
| 2,244,373 | 6/1941 | Powers ........................... | 200/81.9 R X |
| 2,583,814 | 1/1952 | Burklin ........................... | 200/81.9 R X |
| 3,336,451 | 8/1967 | Burton ............................ | 200/82 D |

*Primary Examiner*—J. R. Scott
*Attorney*—F. J. Soucek and C. R. Engle

[57] ABSTRACT

A pressure responsive switch for indicating the loss of pressure in a vehicle brake line with the switch being actuated by piston movement through a swivel or toggle arrangement including a contact ring which is engaged by a contact to complete a circuit when hydraulic pressure occurs. The contact remains in electrical engagement after the toggle returns to its center position. The switch has a stem which is pressed inwardly to recenter the contact after the brake system has been repaired.

1 Claim, 2 Drawing Figures

INVENTOR.
Richard C. Rike

BY F. J. Soucek
ATTORNEY

PISTON ACTUATED PRESSURE RESPONSIVE SWITCH WITH RECENTER CONTACT ADJUSTMENT MEANS

This invention relates generally to a pressure responsive switch and more particularly to a switch for signaling the loss of pressure within the braking system of a motor vehicle.

Conventional braking systems employ a dual master cylinder which has two hydraulic or pneumatic working chambers to supply fluid independently to the front wheel brakes and the rear wheel brakes. If a leak occurs in one line there will be no loss of pressure in the other line and the vehicle will be capable of stopping.

In systems utilizing a dual master cylinder it is desirable to provide means for warning the operator of the vehicle if there is leakage in either the front or rear lines of the braking system.

It is, therefore, a principal object of the present invention to provide a means for sensing the loss of pressure in either the front or rear lines of a braking system employing a dual master cylinder.

It is a further object to provide switch means in a braking system which means is responsive to a loss in pressure in one of the lines and which means may be manually reset after the braking system has been repaired.

Figure 2:
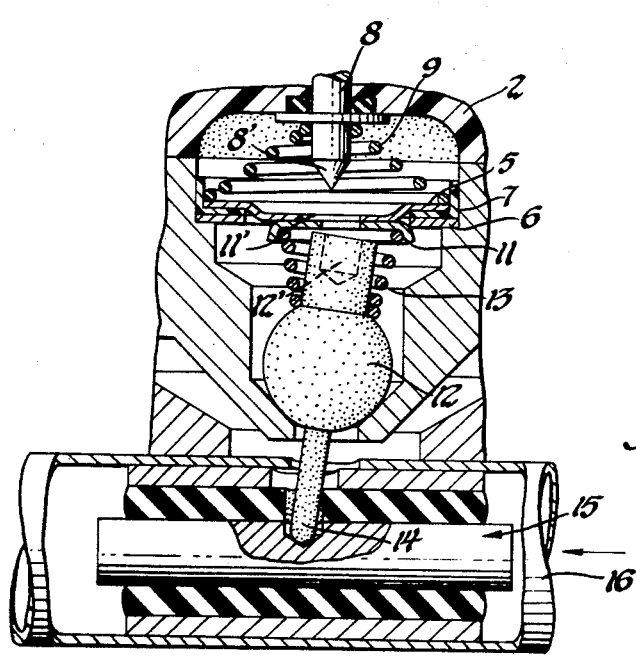

Other objects and attainments of the present invention will become apparent to those skilled in the art upon reading the following description when taken in conjunction with the drawing wherein like reference numerals refer to like parts and wherein:

FIG. 1 is an elevational view in section of the pressure responsive switch of the present invention, and FIG. 2 is a sectional view of a portion of FIG. 1 showing the switch of the present invention in an actuated position.

Referring to FIG. 1, the switch includes a housing having a top portion 2 of plastic or other non-conducting material and a steel base portion 4. Positioned within the housing are a pair of contact rings 5 and 6 separated from each other by an insulator ring 7. A rod-like terminal 8 having a pointed end 8' is vertically movable within the housing and is electrically connected to the contact ring 5 by means of a spring 9. A contact plate 11 having an aperture 11' therein is slidably movable within the housing and is adapted to bridge the contact rings 5 and 6 to complete a circuit therethrough. The contact plate 11 is coupled to a plastic toggle member 12 by means of a centering spring 13. The toggle member 12 has a cylindrical aperture 12' at its upper end and has a lower end 14 connected to a piston assembly 15 positioned in a conduit 16 of a brake system. An electric alarm circuit including a battery 17 and an alarm or indicator 18 is connected between the base 4 of the housing and the terminal 8.

As shown in FIG. 2, as pressure in one side of conduit 16 decreases, the piston assembly moves toward the left, for example, and tilts the top of toggle member 12 to the right. Acting through the spring 13, the toggle member causes contact plate 11 to shift to the right and complete a circuit through contact rings 5 and 6. A circuit is thus completed through the battery 17 and indicator 18 by means of the terminal 8, spring 9, ring 5, contact plate 11, ring 6 and base 4.

To reset the switch after it has been actuated, the rod-like terminal 8 is pushed down until the end 8' enters the apertures 11' and 12' to center the contact plate 11 and the toggle member 12.

Contact plate 11 then no longer bridges the contact rings 5 and 6 and the circuit for battery 17 and indicator 18 is broken.

It is obvious that different modifications and embodiments may be made without departing from the scope of the invention as defined in the following claims.

What is claimed is:

1. A pressure responsive switch assembly for indicating a loss of pressure in a pressurized system comprising a switch housing having a top portion of nonconductive material and a base portion of conductive material, a pair of contact rings positioned in said base portion with one of said rings contacting said base portion, an insulating member positioned between said rings to separate said rings and to insulate the other of said rings from said base portion, a contact plate having an aperture therethrough and being in contact with said other of said rings, said contact member being slidable in said housing to bridge said rings and provide electrical contact therebetween, a toggle member of insulating material tiltably mounted in said base portion and having an aperture in the top end thereof, first spring means positioned between said toggle member and said contact member and biasing said contact member against said other of said rings, said toggle member having a lower end adapted to engage a piston assembly in said pressurized system, a rod-like terminal positioned in the top portion of said switch housing and being vertically slidable in said housing, said terminal having a pointed lower end adapted to pass through the aperture in said contact plate and enter the aperture in said toggle member, and second spring means between said terminal and said other of said contact rings to provide an electrical connection therebetween, said second spring means normally biasing said terminal outwardly with respect to said housing.

\* \* \* \* \*